United States Patent
Wenstrom et al.

[11] 3,875,050
[45] Apr. 1, 1975

[54] METHOD FOR SEPARATING EDIBLE CRAB MEAT FROM NON-EDIBLE PORTIONS OF COOKED CRABS

[75] Inventors: Richard T. Wenstrom, Hampton, Va.; Theodore S. Reinke, Rehobeth Beach, Del.; Calvert B. Tolley, Wingate; J. Clayton Brooks, Cambridge, both of Md.

[73] Assignee: Sea Savory, Inc., Cambridge, Md.

[22] Filed: Jan. 30, 1974

[21] Appl. No.: 437,808

Related U.S. Application Data

[63] Continuation-in-part of Ser. No. 229,908, Feb. 28, 1972, abandoned.

[52] U.S. Cl. ............... 209/11, 209/4, 209/46
[51] Int. Cl. ............................................. B07b 13/00
[58] Field of Search ............ 209/2, 11, 45, 46, 3, 4; 426/479, 480

[56] References Cited
UNITED STATES PATENTS

| | | | |
|---|---|---|---|
| 581,908 | 5/1897 | Gent et al. | 209/45 X |
| 2,794,550 | 6/1957 | Warner | 209/46 |
| 3,006,465 | 10/1961 | James | 209/45 |
| 3,114,703 | 12/1963 | Brison | 209/11 |
| 3,508,646 | 4/1970 | Conrad et al. | 209/45 |

*Primary Examiner*—Frank W. Lutter
*Assistant Examiner*—Ralph J. Hill
*Attorney, Agent, or Firm*—Scrivener Parker Scrivener & Clarke

[57] ABSTRACT

A method for separating edible meat from the non-edible portions of cooked crabs wherein the crabs are broken into small meat particles and non-edible portions and these are fed to a rotating heated drum. The edible meat particles adhere to the drum for removal therefrom by suitable scraping means while the non-edible parts do not adhere to the drum and are thrown off in advance of the scraping means.

2 Claims, 4 Drawing Figures

PATENTED APR 1 1975   3,875,050
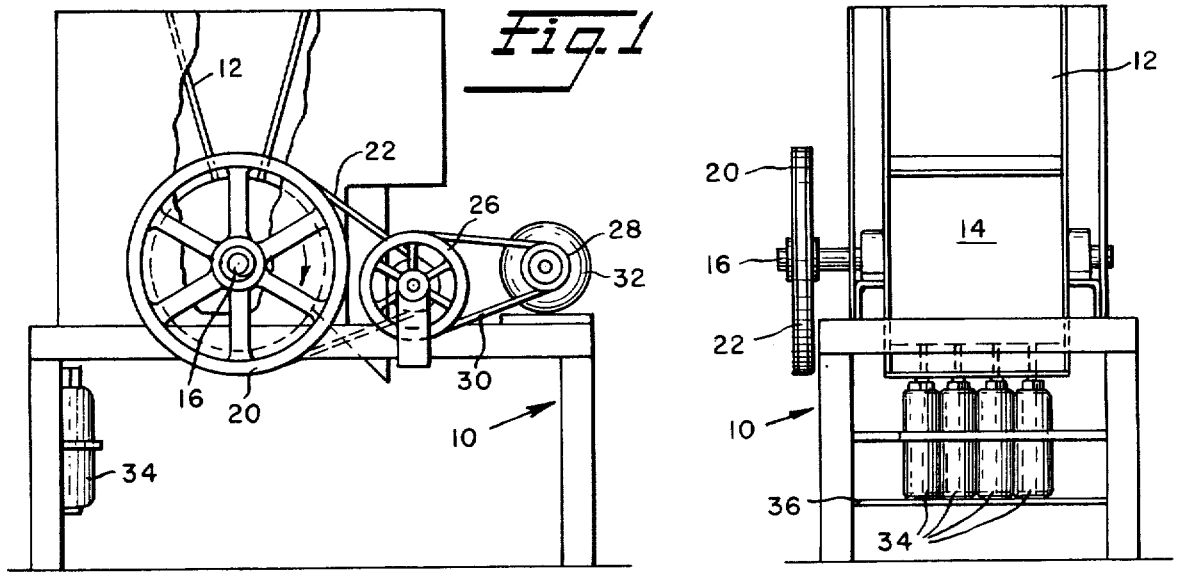
Fig.1
Fig.2
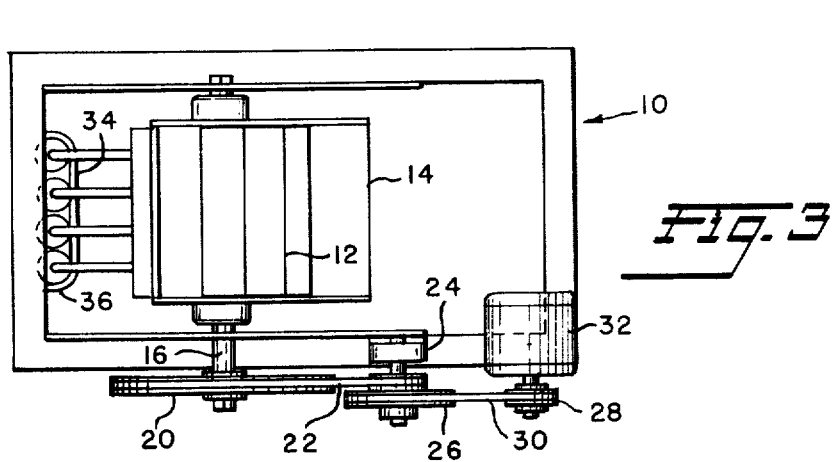
Fig.3
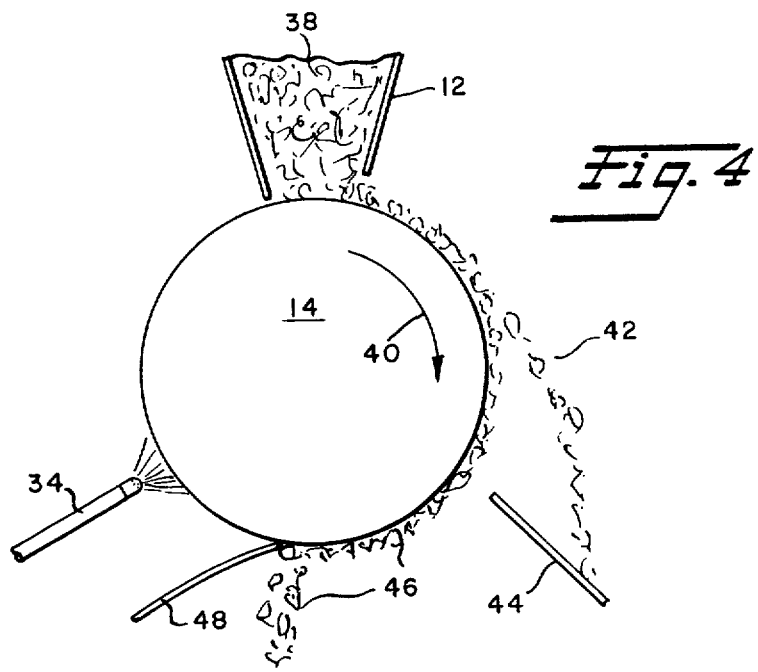
Fig.4

METHOD FOR SEPARATING EDIBLE CRAB MEAT FROM NON-EDIBLE PORTIONS OF COOKED CRABS

The present application is a continuation-in-part of application Ser. No. 229,908 filed Feb. 28, 1972 and now abandoned.

DESCRIPTION OF THE INVENTION

Various methods and machines have heretofore been proposed for removing the edible meat from cooked crabs wherein the outer shell and entrails have been removed to be followed by removal of the edible meat from the remaining portion of the body of the crab. However, such prior methods and apparatus have not been satisfactory since they have been complicated and costly and are not adapted for treatment of crabs of various sizes. In addition, it has been found that such methods and machines only a portion of the edible meat is removed, thereby resulting in considerable waste.

It is accordingly the principal object of the present invention to provide a relatively simple method and machine for the efficient removal of the cooked crab meat from the non-edible portions of the crabs wherein substantially all of the edible meat is removed without regard to variations in the sizes or species of the crabs.

Another object resides in feeding the crabs, which have been previously broken into small particles to a heated rotating drum wherein the edible meat particles adhere to the drum to be scraped therefrom for inspection and packaging and wherein the non-edible portions which do not adhere to the drum are thrown off for collection and subsequent disposal. In this manner, the non-edible parts are disposed of in advance of the removal of the edible parts.

Other objects and novel features of the invention will appear more fully hereinafter from a consideration of the following description when taken in connection with the accompanying drawing illustrative of one form of the invention. It will be expressly understood however, that the drawings are not to be taken as a definition of the limits of the invention, reference being had for this purpose to the appended claims.

Referring to the drawings wherein similar reference characters denote similar parts throughout the several views:

FIG. 1 is a side view, having certain parts broken away, of a machine embodying the principles of the present invention;

FIG. 2 is a rear view of the machine of FIG. 1;

FIG. 3 is a top view, and

FIG. 4 is a diagrammatic view illustrating the hopper and drum and showing the manner in which the edible crab particles are separated from the non-edible portions.

At the outset, it is desired to point out that the present invention is especially adapted to a method for the separation and collection of the edible portions of cooked crabs which have previously been broken into small fragments or particles of meat and non-edible parts such as claws, legs entrails, shell etc.

Referring to FIGS. 1, 2, and 3, the machine of the present invention comprises a suitable frame 10 on which is mounted a stationary hopper 12 into which the broken particles of the cooked crabs are fed in any suitable manner. A metal drum 14, preferably of stainless steel, is mounted upon a shaft 16 which in turn is rotatably mounted on the frame 10 and suitable driving means including a wheel 20, belt 22, pulleys 24, 26, and 28 and belt 30 are provided for rotating the drum 14 at a selected speed by a suitable electric motor 32. The drum is heated to a selected temperature range by electrical, steam or any other suitable means and in the form illustrated, such means comprises a plurality of gas burners 34 which may be supported by a rack 36 carried by the frame 10.

An important feature of the present invention resides in the discovery that when the broken particles of the cooked crabs are fed into the hopper 12 to be subjected to the action of the heated rotating drum, the edible portions of the crab will adhere to the drum while the non-edible portions will not, providing the speed of rotation of the drum and the temperature thereof are maintained within certain limits. In the present method, the peripheral drum speed is maintained between 3 and 400 feet per minute while the heating means is adjusted to maintain the outer surface of the drum 14 at a temperature within the range from 150° to 450°F. In other words, as the peripheral drum speed is increased, the temperature of the drum may be likewise increased. It has been determined that optimum results for carrying out the present method have been obtained when the peripheral speed of the drum is maintained between 50 to 150 feet per minute while the temperature of the drum is maintained between 250° to 350°F. Within these limitations, the edible meat portions will adhere to the drum surface while the non-edible parts will be thrown away from the drum surface.

The method of operation of the invention is clearly illustrated by FIG. 4 which diagrammatically shows the broken fragments 38 of the cooked crabs being fed into the hopper 12 to be picked up by the heated rotating drum 14. Therefrom it will be seen that the fragments or particles of the crabs will be carried around in the direction of the arrow 40 to a point where the non-edible portions 42 which do not adhere to the heated drum are thrown off in a curved path to be deflected by a suitable deflector 44 into any convenient container for subsequent treatment or disposal. On the other hand, the edible crab meat particles 46 will adhere to the heated drum and may be effectively removed from the drum surface by a suitable scraper 48 for inspection and packaging.

It has been found in practicing the present method that with the drum rotated at a peripheral speed as above indicated and with the drum surface maintained within the prescribed temperature range, the separation of the edible portions from the non-edible particles may be readily accomplished without any deleterious effects insofar as the edible crab meat portions are concerned.

While one embodiment of the method and apparatus have been shown and described herein, it will be understood that the scope thereof is to be determined by the appended claims.

We claim:

1. A method of separating edible portions from non-edible portions of broken fragments of cooked crabs comprising the steps of
   1. feeding the broken fragments to a hopper;
   2. directing the broken fragments from the hopper to the surface of a drum disposed beneath the hopper,
   3. rotating the drum at a peripheral speed in the range of 3 to 400 feet a minute;

4. heating the drum to a temperture within the range between 150° to 450°F such that the edible portions of the fragments will adhere to the drum surface and the non-edible portions will fall away from the drum surface; and
5. removing the edible portions from the surface of the drum.

2. A method of separating edible portions from non-edible portions of broken fragments of cooked crabs comprising the steps of
1. feeding the broken fragments to a hopper;
2. directing the broken fragments from the hopper to the surface of a drum disposed beneath the hopper,
3. rotating the drum at a peripheral speed in the range of 50 to 150 feet a minute;
4. heating the drum to a temperature within the range between 250° to 350°F such that the edible portions of the fragments will adhere to the drum surface and the non-edible portions will fall away from the drum surface; and
5. removing the edible portions from the surface of the drum.

* * * * *